United States Patent
Chaupin et al.

(10) Patent No.: US 10,047,889 B2
(45) Date of Patent: Aug. 14, 2018

(54) TUBULAR CONNECTOR WITH AN AUTOMATIC CONNECTION

(71) Applicant: A RAYMOND ET CIE, Grenoble (FR)

(72) Inventors: Jerome Chaupin, Saint Pierre d'Allevard (FR); Frederic Poggi, Seyssinet-Pariset (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 14/758,415

(22) PCT Filed: May 21, 2015

(86) PCT No.: PCT/FR2015/051336
§ 371 (c)(1),
(2) Date: Jun. 29, 2015

(87) PCT Pub. No.: WO2015/177472
PCT Pub. Date: Nov. 26, 2015

(65) Prior Publication Data
US 2017/0067588 A1 Mar. 9, 2017

(30) Foreign Application Priority Data
May 22, 2014 (FR) ...................... 14 54636

(51) Int. Cl.
*F16L 37/088* (2006.01)
*F16L 37/14* (2006.01)

(52) U.S. Cl.
CPC .......... *F16L 37/088* (2013.01); *F16L 37/144* (2013.01); *F16L 2201/10* (2013.01)

(58) Field of Classification Search
CPC ... F16L 37/088; F16L 37/144; F16L 2201/10; F16L 37/1225; F16L 21/08; F02M 2200/8023

USPC .................. 285/305, 321, 319; 403/187, 345
See application file for complete search history.

(56) References Cited

U.S. PATENT DOCUMENTS

| 6,702,335 B2 | 3/2004 | Bahner |
| 7,651,138 B2 * | 1/2010 | Feger .................... F16L 37/144 285/305 |

(Continued)

FOREIGN PATENT DOCUMENTS

| CN | 101036019 A | 9/2007 |
| CN | 101660642 A | 3/2010 |

(Continued)

OTHER PUBLICATIONS

International Search Report dated Apr. 8, 2016.
(Continued)

*Primary Examiner* — Carib A Oquendo
(74) *Attorney, Agent, or Firm* — Dickinson Wright PLLC (57) ABSTRACT

A tubular coupling comprising a female connector (2) into which a male connector (6) provided with an annular collar (7) is designed to be inserted axially, and a connection element (9) that extends in a transverse direction in the female connector. The connection element is designed to interfere mechanically with the collar while the male connector is being inserted into the female connector, and to move by itself in said transverse direction towards the inside of the female connector. In addition, the connection element and the female connector are also designed so that, after the reaction to the radial resilient deformation of the connection element on the collar of the male connector, they come to bear against each other in the manner of a projection (14) that, by resilient return, exerts pressure on a guide ramp (15), so as to generate a thrust force that extends the movement of the connection element towards the inside of the female connector.

7 Claims, 6 Drawing Sheets

(56) References Cited

U.S. PATENT DOCUMENTS

| | | | |
|---|---|---|---|
| 7,823,930 B2 | 11/2010 | Feger et al. | |
| 8,033,575 B2 | 10/2011 | Tsurumi | |
| 2001/0043833 A1 | 11/2001 | Bahner et al. | |
| 2005/0087981 A1* | 4/2005 | Yamada | F16L 37/0982 285/81 |
| 2007/0273150 A1* | 11/2007 | Tsurumi | F16L 37/144 285/305 |
| 2010/0052315 A1 | 3/2010 | Kerin et al. | |
| 2011/0127766 A1 | 6/2011 | Tsurumi | |
| 2012/0211977 A1* | 8/2012 | Callahan | F16L 37/144 285/313 |
| 2012/0326435 A1 | 12/2012 | Okazaki | |
| 2016/0069496 A1* | 3/2016 | Tayama | F16L 21/045 285/374 |

FOREIGN PATENT DOCUMENTS

| | | |
|---|---|---|
| CN | 204664684 U | 9/2015 |
| EP | 1 158236 A1 | 11/2001 |
| EP | 1158236 A1 | 11/2001 |
| EP | 1 801 484 A1 | 6/2007 |
| EP | 1801484 A1 | 6/2007 |
| FR | 2 903 164 A1 | 1/2008 |
| FR | 2903164 A1 | 1/2008 |
| JP | 2008082463 A | 4/2008 |
| JP | 2010270867 A | 12/2010 |

OTHER PUBLICATIONS

Chinese Office Action dated Oct. 10, 2016.
Chinese Office Action for Application No. 2015102640312 dated Jun. 28, 2017.

\* cited by examiner

TUBULAR CONNECTOR WITH AN AUTOMATIC CONNECTION

TECHNICAL FIELD

The present invention relates to the field of tubular couplings for connecting fluid pipes or ducts, e.g. fuel hoses for motor vehicles.

More particularly, the invention relates to a tubular coupling comprising a female connector into which a male connector provided with an annular collar is designed to be inserted axially, and a connection element that extends in a transverse direction in the female connector and that is designed to be deformed resiliently and radially towards the outside of the female connector by mechanically interfering with said collar while the male connector is being inserted into the female connector, and, in reaction to this radial resilient deformation, to move by itself in said transverse direction towards the inside of the female connector.

PRIOR ART

Such a tubular coupling for coupling hoses is already known, in particular from Patent Document US 2012/0326435.

In that known tubular coupling, the connection element constitutes a retaining element for locking the male connector in position when it is pushed fully into the female connector, in particular by means of a latch that extends transversely in the female connector behind the collar of the male connector in such a manner as to lock it axially.

The connection or retaining element is further provided with two prongs that are spaced apart from each other, like a sort of U-shaped clip, and that extend in a transverse direction inside the female connector, each prong having an axially facing face for interfering with the collar of the male connector.

The connection element is firstly positioned in the female connector in a pre-assembly high position in which the web of the U-shaped part projects outside the female connector and the two prongs of the connection element extend substantially on either side of the male connector in front of the collar of said male connector (if it is considered that the front of the collar corresponds to the axially facing face of the collar that is further downstream along the axis in the insertion direction in which the male connector is inserted into the female connector).

When the male connector is pushed in axially into the female connector, the front face of the collar of the male connector then comes to interfere with front axially facing faces of the prongs of the connection element that slant relative to the axial direction and also relative to the transverse direction. As a result, the prongs of the connection element are caused to move apart radially and resiliently in reaction to the thrust force that is exerted axially on the slanting front axially facing faces and the connection element is caused to move transversely in the female connector in reaction to the thrust force that is exerted transversely on said slanting front axially facing faces. While resiliently moving apart radially, the resilient prongs accumulate return energy. The maximum extent of moving apart of the resilient prongs during the transverse movement of the connection element corresponds to the diameter of the collar.

While the connection element is moving down into the female connector, the prongs move apart over the collar until they reach their maximum extent of moving apart, namely the diameter of the collar. Then, once they have gone past the diameter and by means of the energy accumulated by the resilient moving apart, the prongs return with a thrust force component that extends in the transverse direction and that continues briefly to move the connection element transversely towards the inside of the female connector.

An automatic-connect coupling is thus obtained.

The connection element in that known tubular coupling further also includes a fixed frame extending transversely in the female connector and parallel to the prongs of the connection element, and that, at its base, has a resilient tongue that extends slantwise relative to the axial direction of the female connector.

That tongue is arranged in such a manner that, while the male connector is being pushed axially into the female connector, the male connector pushes the tongue to move it axially relative to its base. As a result, the resilient tongue stores energy by compression, and, when the resilient prongs of the connection element go past the diameter of the collar while the connection element is moving transversely, the tongue is released and generates a thrust force on the connection element that tends to move it towards the inside of the female connector in the transverse direction.

The connection element is then in its retaining low position in which the latch then prevents the male connector from moving axially in the female connector. In that low position, the connection element appears almost fully retracted into the female connector. The tongue thus makes it possible to extend the pushing-in of the connection element into the female connector after going past the diameter of the collar of the male connector during its transverse movement.

Unfortunately, that known tubular coupling suffers from drawbacks.

Firstly, it requires a plurality of separate parts that interact with one another to achieve the retaining or locking of the male connector in the female connector and the automatic movement of the connection element towards the inside of the female connector.

These various parts require complex drive co-ordination between them. They also increase the costs of manufacturing the tubular coupling. The tubular coupling also has a body that has many through openings that make it less robust.

In addition, the stroke of the connection element, after going past the collar, depends on the magnitude of the deformation of the tongue, and, in practice, that stroke is relatively short due to the miniaturization of the parts.

As a result, the difference between the pre-assembly high position and the low position of the connection element is small, and so that difference is difficult to perceive, either visually or by touch.

SUMMARY OF THE INVENTION

An object of the invention is thus to mitigate the above-indicated drawbacks.

To this end, the invention provides a tubular coupling comprising a female connector into which a male connector provided with an annular collar is designed to be inserted axially, and a connection element that extends in a transverse direction in the female connector and that is designed to be deformed resiliently and radially towards the outside of the female connector by mechanically interfering with said collar while the male connector is being inserted into the female connector, and, in reaction to this radial resilient deformation, to move by itself in said transverse direction towards the inside of the female connector, said tubular coupling being characterized in that said connection element and said female connector are also designed so that, after the reaction to the radial resilient deformation of the connection element on the collar of the male connector, they come to bear against each other in the manner of a projection that, by resilient return, exerts pressure on a guide ramp, so as to generate a thrust force that extends the movement of said connection element in said transverse direction towards the inside of the female connector.

The basic idea of the invention is thus to enable the energy that is released by the connection element on its resilient return to be transformed effectively into a thrust force that is controlled and directed in the transverse direction of movement of the connection element towards the inside of the female connector. In particular, the ramp may be designed to extend beyond the collar in the transverse direction in such a manner as to lengthen the movement of the connection element in the transverse direction.

With this arrangement of the invention, it is possible to move the connection element in the transverse direction over a stroke that is longer, thereby making it possible to position the connection element in the pre-assembly fitting position at a height that is greater than in the known tubular coupling that is presented above, and, in addition, it is possible also to force the connection element into the female connector over a greater distance.

As a result, with the arrangement of the invention, it is possible to have a difference in positioning of the connection element between its pre-assembly position and its low position that is sufficiently large to constitute a reliable indicator for checking visually or by touch that the male connector is fully coupled to the female connector. In addition, with this arrangement of the invention, it is possible to obtain coverage of the connection element over the collar that is sufficient to guarantee good mechanical strength.

In addition, the arrangement of the invention can be implemented in a female connector body that remains relatively closed (i.e. with few openings through it), thereby making it possible to reduce the effects of contaminant sources such as dust being deposited inside the female connector, and to increase the robustness of the body.

The coupling of the invention may have the following features:

said connection element is U-shaped with two prongs spaced apart from each other and extending in said transverse direction, each prong having an axially facing face for interfering with said collar, in that the female connector has an inside surface that defines two guide ramps that extend in said transverse direction in a manner such as to slant relative to each other, and in that two projections are provided on respective ones of the two prongs of the connection element so as to come to bear on respective ones of said guide ramps in order to generate said thrust force;

each guide ramp may have a contact surface that is provided with ribs or with bumps;

each guide ramp may have a guide end that is terminated by a recess into which the projection of a corresponding prong of the connection element comes to be engaged;

said connection element moves by itself in said transverse direction between a pre-assembly high position in which it projects outside the female connector and a retaining low position in which it is fully pushed into the female connector and comes flush with the outside surface of the female connector;

the coupling may further include a visual indicator for checking proper assembly, e.g. marking that is placed on the surface of the ramp and that disappears behind the corresponding projection when the connection element is pushed fully into the female connector, or indeed marking that is placed on the connection element and that is covered over when the connection element is inserted into the female connector; and the coupling includes an indicator clip designed to be inserted into the connection element while the male connector is being inserted into the female connector and serving as an indicator of assembly of the coupling.

Other characteristics, advantages, and details of the present invention appear on reading the following description of an embodiment of the invention that is given by way of non-limiting illustration, this description being given with reference to the accompanying drawings that are presented briefly below.

DESCRIPTION OF EMBODIMENTS

Figure 1:
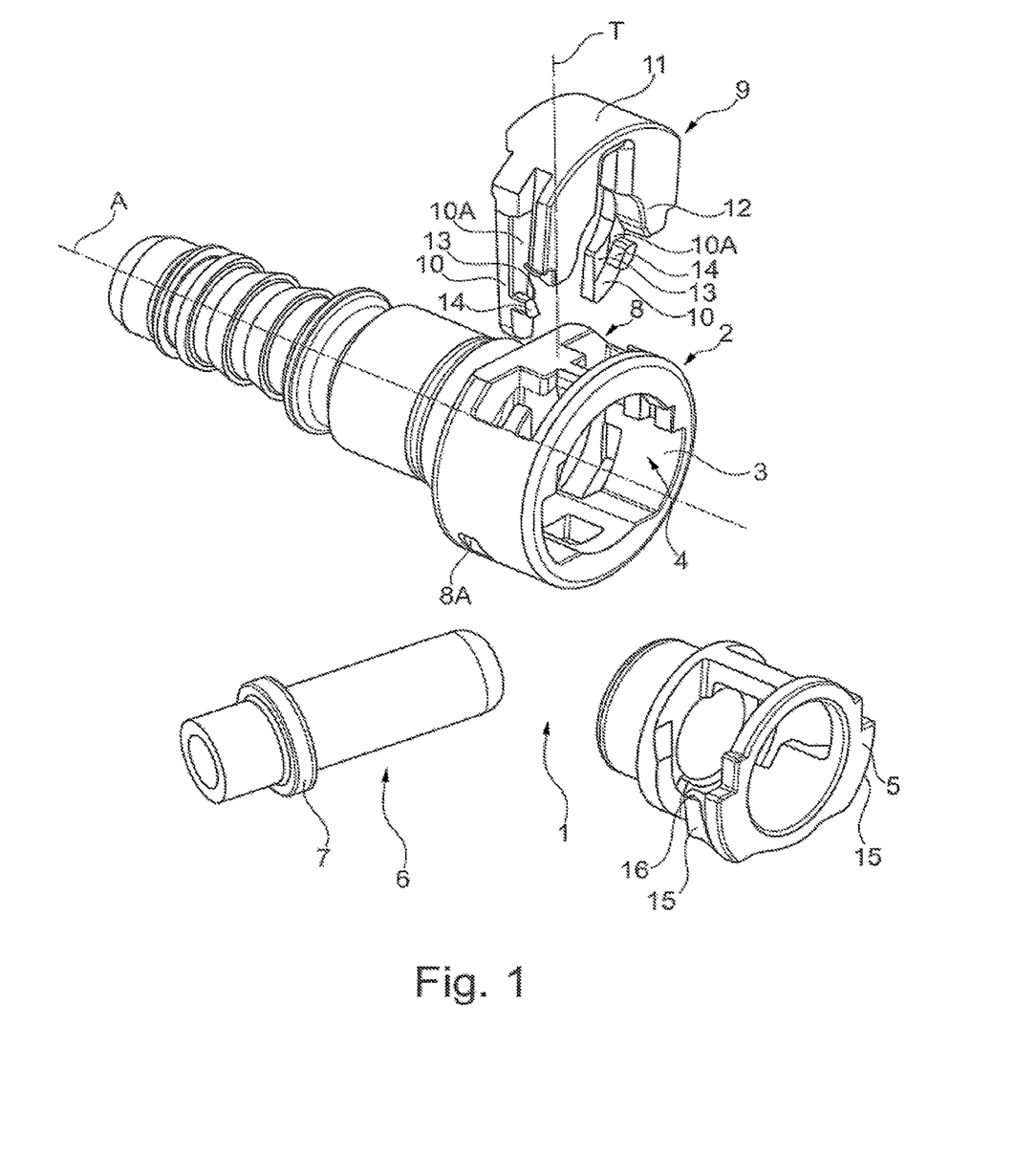
FIG. 1 is a diagrammatic exploded view of the tubular coupling of the invention, which, in this example comprises a female connector, a ring internal to the female connector, a male connector having a collar, and the connection element, which, in this example, is a U-shaped clip.

As can be seen in FIG. 1, the tubular coupling of the invention includes a female tubular end-piece (female connector) 2, which, in this example, is in two portions comprising a tubular main body 3 that extends in an axial direction A, and that is provided with an axial opening 4, and a ring 5 that is suitable for being axially engaged by interfitting into the opening 4 in the main body 3.

It is understood that the invention extends to include a female end-piece that is in one piece or that forms an integrally molded part.

In the tubular coupling 1, a male connection tubular end-piece (male connector) 6 is provided for being inserted axially into the female connector, and, in this example, into the ring 5 thereof.

The male connector 6 is in the form of an elongate cylindrical tube and has an annular collar 7 around its circular periphery, the diameter of the annular collar 7 being slightly less than the inside diameter of the ring 5. As can also be seen in FIG. 1, the body of the female connector is internally hollow with a radial opening 8 at the top, forming a sort of slideway into which the connection element 9 can be inserted transversely and in which said connection element can slide.

In this example, the connection element 9 is in the form of a U-shaped clip having two resilient prongs 10 spaced apart from each other and connected together at the web 11 of the U-shape.

The two prongs 10 are of shaped profiles so that they form sort of runners that can slide in the grooves of the slideway defined by the radial opening 8.

The connection element also includes a latch 12 designed to come behind the collar of the male connector 6 in such a manner as to retain it and to lock it in the axial direction A when the male connector is fully pushed into the female connector 2.

The prongs of the connection element 9 are also arranged so that the connection element moves by itself towards the inside of the female connector 2 in the transverse direction T by means of a thrust force that is generated by reaction to radial resilient deformation of the prongs that occurs on pushing the male connector into the female connector.

More particularly, each prong 10 of the connection element 9 has an axially facing face 10A that faces the collar 7 of the male connector 6 when said male connector is engaged in the female connector 2.

In its portion situated below the midplane of the axial opening 4 of the female connector 2, the axially facing face 10A of each prong 10 has a slanting surface 13 that, when the connection element 9 is in the pre-assembly high position inside the female connector 2, serves to interfere with the collar 7 of the male connector 6 when said male connector is pushed into the female connector 2.

The surface 13 extends slantwise both relative to the axial direction A and also relative to the transverse direction T when the connection element is inserted into the female connector so as to generate said thrust force pointing in the transverse direction T.

In addition, in accordance with the invention, and, for example, on the axially facing face 10A of each prong 10 of the connection element (and, in this example, at the top of the slanting surface 13), a projection 14 is provided that projects in the axial direction A.

Two guide ramps 15 that slant relative to each other are formed, in this example, on the lateral sides of the peripheral outside surface of the ring 5. These two guide ramps 15 face clearance radial slots 8A that can be seen in FIG. 1 and that are provided in the annular peripheral surface of the female connector 2. These radial slots leave empty space for enabling the prongs of the connection element to move apart radially inside the female connector, it being possible for said prongs also to be provided with a lateral catch that engages with the top edge of a radial slot to prevent the connection element from coming out of the female connector. Without restricting the scope of the invention, a catch may also be placed on the non-flexible portion of the connection element in such a manner as to engage in the radial slot of the female connector (not shown in the figures).

These two slantwise ramps 15 start significantly below the midplane of the opening 4 of the female connector and extend towards each other in the radial direction T towards the side of the female connector that is diametrically opposite from the radial opening 8. In this example, these two guide ramps 15 are rectilinear, and are offset axially from the collar, and together they form a sort of V-shape that, when seen looking in the axial direction, cradles the collar of the male connector (in other words, the collar fits into the V-shape).

The projections 14 and the guide ramps 15 are arranged such that when the connection element 9 is inserted into the female connector 2 and when it goes past the collar 7 of the male connector 6 (i.e. passes from the front to the back of the collar 7), the prongs then being fully spaced apart from each other, each projection 14 on a corresponding prong comes to bear on a corresponding guide ramp 15, while the bearing of the prong itself on the periphery of the collar 7 of the male connector tends to diminish. The bearing on the periphery of the collar tends to be replaced by the bearing on the ramp.

Figure 2A:
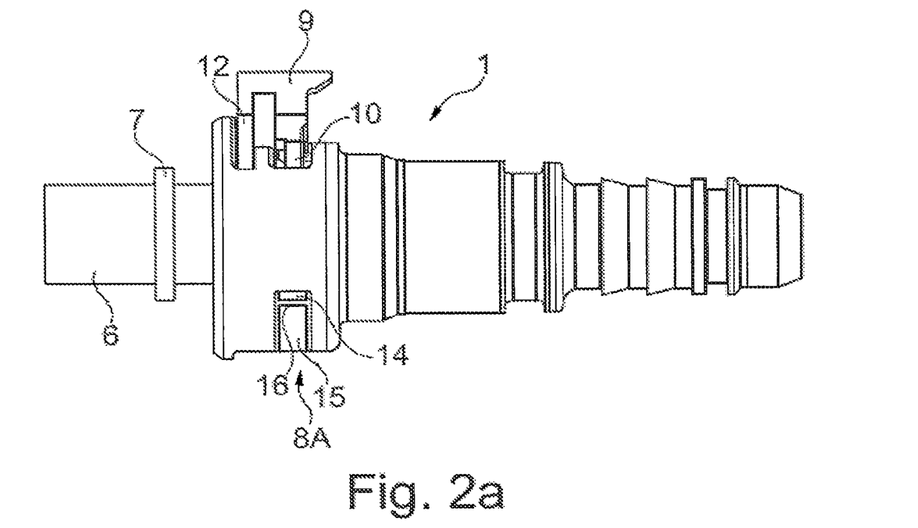
FIGS. 2a and 2b are diagrammatic profile views of the coupling of the invention, respectively with the connection element in the pre-assembly high position in which it projects outside the female connector and with the connection element in the retaining low position in which it is flush with the outside surface of the female connector.

In FIG. 2a, the male connector 6 is inserted partially into the female connector 2.

The connection element 9 is in the pre-assembly high position in the female connector 2.

The prongs 10 of the connection element 9 are in front of the collar 7 of the male connector.

The projection 14 on each prong 10 is in abutment against a top edge 16 of a guide ramp 15 that is visible through the radial slot 8A in the female connector.

Figure 2B:
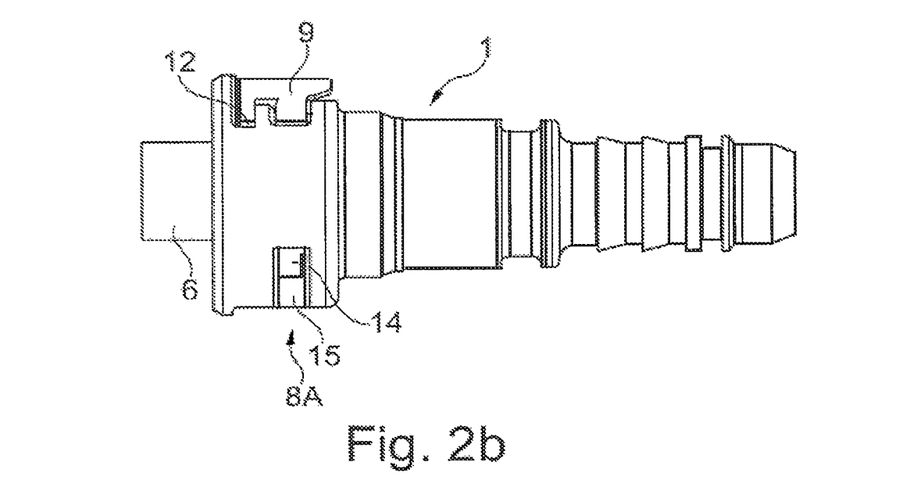

In FIG. 2b, the male connector 6 is fully pushed into the female connector 2.

The connection element 9 is in the retaining and locking low position in the female connector. The latch 12 of the connection element 9 is behind the collar 7 of the male connector, thereby preventing any axial movement of the male connector 6 in the female connector 2.

Figure 6:
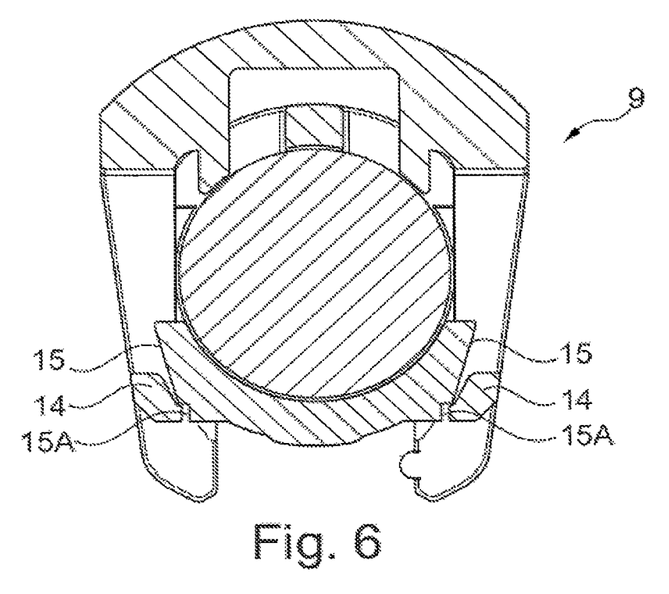
FIGS. 6 and 7 are diagrammatic cross-section views of the connected coupling in two different embodiments.

The projection 14 on each prong is then locked in a recess 15a at the bottom of the corresponding ramp 15, thereby preventing the connection element from being removed from the female connector by merely pulling on the connection element 9, as shown in FIG. 6. However, provision may be made to make it possible for the connection element to be removed from the female connector after the projection 14 has been intentionally disengaged from the recess in the ramp, e.g. by using a spike.

As shown in FIG. 2b, when the connection element is in the low position, the top of the connection element 9 (i.e. the web of the U-shape of the clip) comes flush with the outside surface (the top surface in this example) of the female connector.

When the connection element is in the pre-assembly high position, the top of the connection element 9 projects to an extent relative to the top outside surface of the female connector, e.g. approximately in the range 4 millimeters (mm) to 5 mm, sufficient for an operator to be able to distinguish with certainty, by checking visually or by touch, between the low position and the pre-assembly high position of the connection element.

The driving of the connection element as it moves by itself into the female connector is shown in FIGS. 3a to 5b.

Figure 3A:
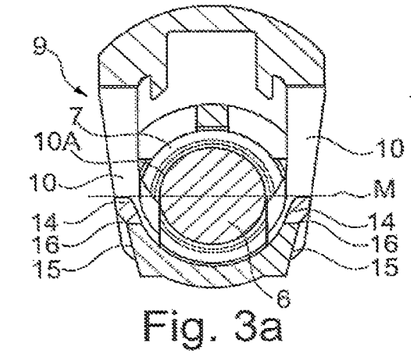
FIGS. 3a and 3b are diagrammatic views, respectively in cross-section and in perspective, showing a state of mechanical interference between the connection element and the collar of the male connector in a first insertion stage for inserting the male connector into the female connector.
Figure 3B:
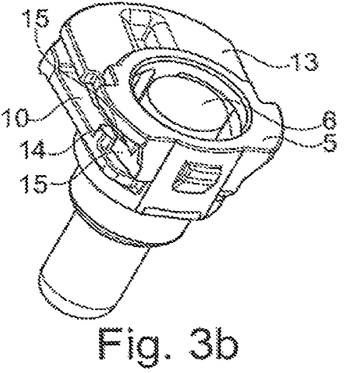

In FIGS. 3a and 3b, the connection element 9 is in the pre-assembly high position. The male connector 6 is partially inserted into the female connector 2 and is in a pre-assembly position.

The prongs 10 of the connection element 9 are in front of the collar 7 of the male connector.

It can be seen, in particular, that the slanting surface 10A on each prong 10 (the slanting surface 10A is at the back of the prong 10 in the figure) is disposed in a bend of the prong that extends below the midplane M of the axial opening of the female connector 2 and comes to interfere mechanically in the axial direction with the collar 7 of the male connector 6.

In this situation, each projection 14 is in abutment against an edge 16 at the end of a respective guide ramp 15. This arrangement makes it possible to prevent the connection element from being pushed unintentionally into the female connector without the male connector being present in the female connector.

Figure 4A:
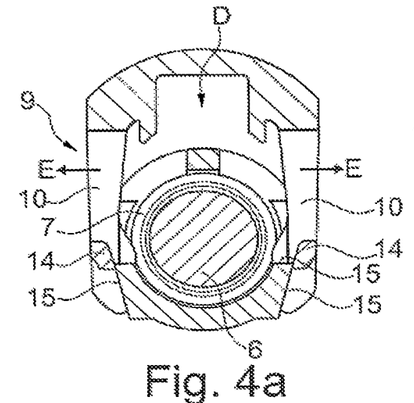
FIGS. 4a and 4b are diagrammatic views, respectively in cross-section and in perspective, showing a second state of interference between the connection element and the collar of the male connector in a subsequent second insertion stage for inserting the male connector into the female connector.
Figure 4B:
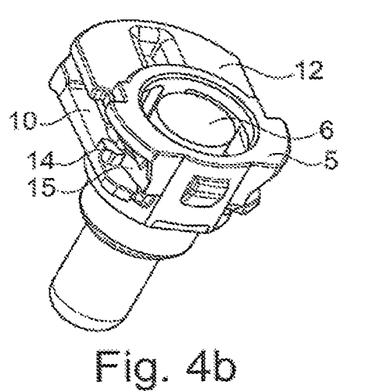

In FIGS. 4a and 4b, the male connector 6 has been pushed in a little further into the female connector and the collar 7 is exerting axial pressure on the slanting surfaces 10A of the prongs 10 of the connection element 9.

This axial thrust causes the prongs 10 to move radially apart as indicated by arrows E and, at the same time, causes a movement in translation in the transverse direction towards the inside of the female connector, as indicated by arrow D once the projection 14 is disengaged from the edge of the ramp 15.

It can be seen in these figures, once it is disengaged from the edge 16 of the corresponding ramp 15, each projection 14 allows the connection element to move as indicated by arrow D. Each projection 14 can then be placed facing a ramp 15.

Figure 5A:
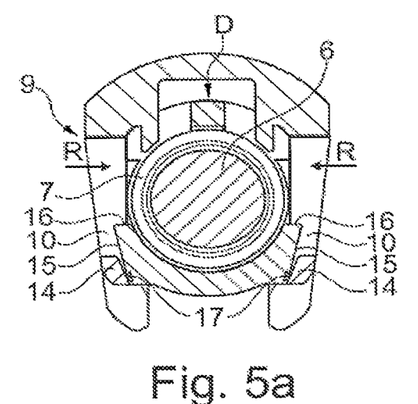
FIGS. 5a and 5b are diagrammatic views, respectively in cross-section and in perspective, showing a state of mechanical interference between the connection element and the collar of the male connector in a subsequent third insertion stage for inserting the male connector into the female connector.
Figure 5B:
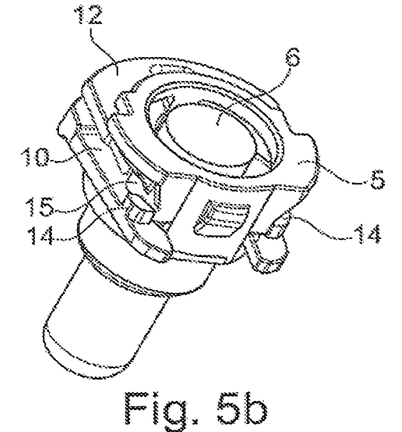

In FIGS. 5a and 5b, the male connector 6 is fully pushed into the female connector 2.

By moving transversely into the female connector, the prongs 10 pass "under" the collar 7 of the male connector, i.e. they cross the midplane of the collar 7 in the direction D, and return resiliently by moving towards each other as indicated by arrows R.

The projections 14 then exert pressure on the ramps 15, which pressure is transformed into a thrust force component as indicated by arrow D, thereby causing the connection element 9 to continue, by itself, its movement towards the inside of the female connector until the projections reach the bottom ends of the ramps 15. It can be understood that each projection 14 moves by sliding over the corresponding ramp 15 until the pressure it exerts on said ramp becomes zero. The connection element 9 has then reached its retaining and locking low position inside the female connector.

Figure 7:
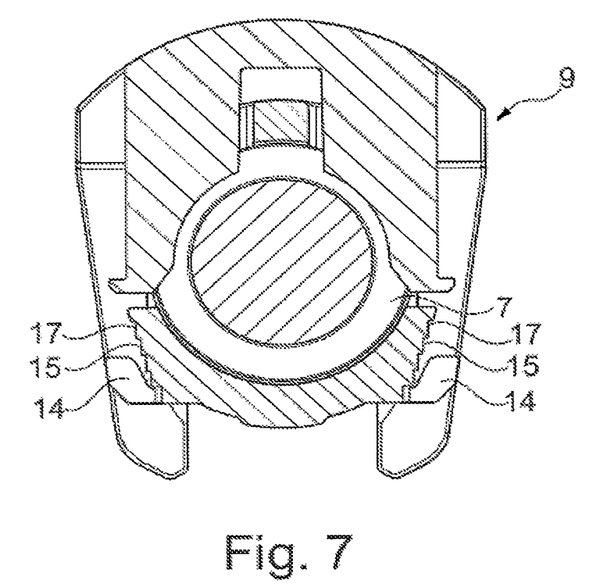

In an embodiment of the invention shown in FIG. 7, it is possible, at the surface of each ramp 15, to provide ribs 17 or bumps placed in such a manner that the projection 14 passing over said ribs or bumps 17 generates a clicking noise that serves as an audible indicator that the connection element is reaching the end of its stroke. These ribs are also designed to allow the locking element to move downwards only, into the low position, and to prevent it from rising back up into the pre-assembly position under the effect of vibration. It is nevertheless possible to move the connection element back up into the pre-assembly position by exerting a traction force sufficient to deform the prongs.

It is also possible, in the tubular coupling 1 of the invention, to provide a visual indicator for checking that the male connector is fully pushed into the female connector, such an indicator being in the form of marking placed, for example, at the lower end of each ramp, this marking being covered over by a projection once the connection element has reached its retaining and locking low position. It is also possible to provide marking placed on the connection element that is covered over once the connection element is inserted into the female connector.

The connection element in the automatic-connect coupling of the invention may be adapted to male connectors of different profiles or of different diameters and to collars of different radii.

The tubular coupling 1 of the invention is made up of few distinct parts, and all of them can be made of plastics material, e.g. by injection molding.

Figure 8:
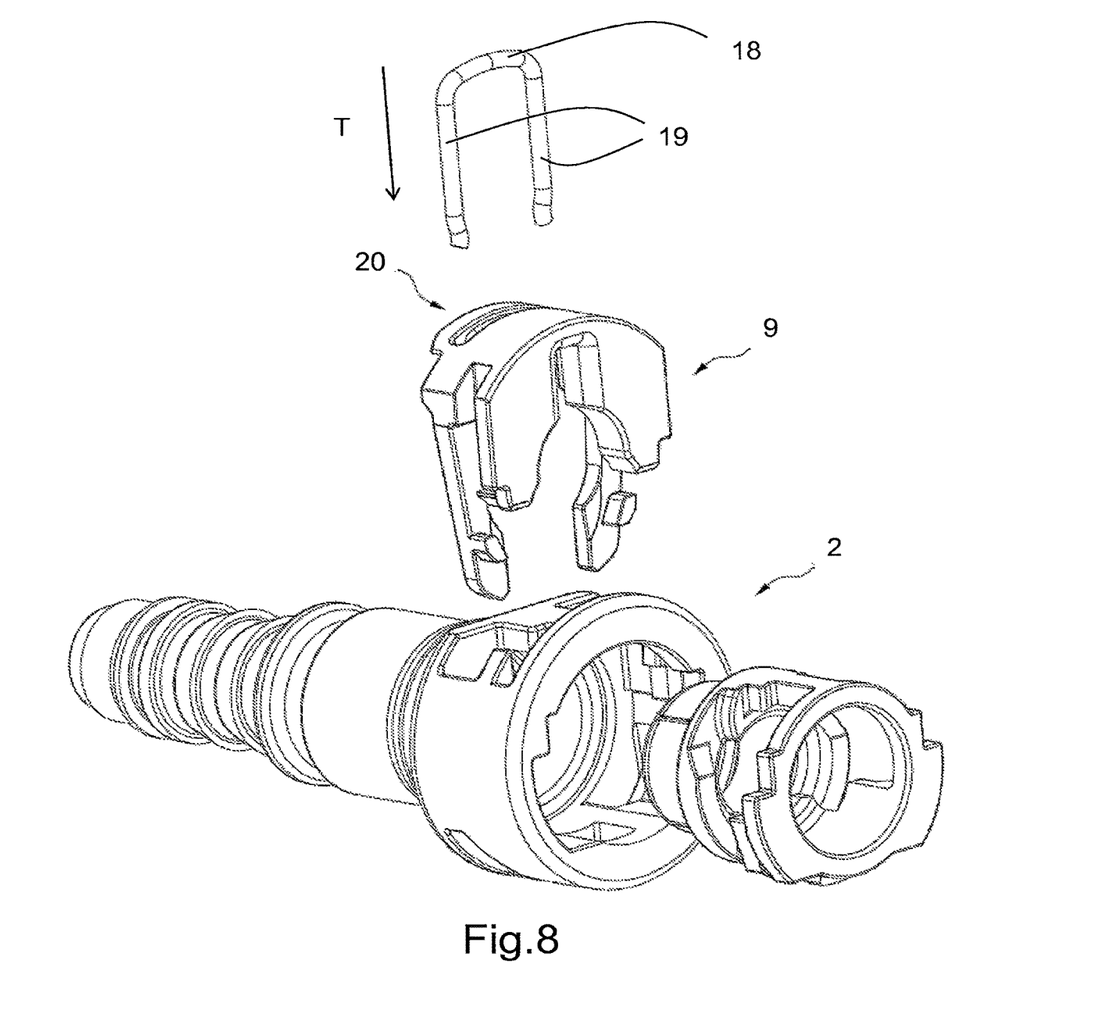
FIG. 8 is a diagrammatic exploded view of a variant embodiment of a tubular coupling of the invention having an indicator clip for two-stage checking of proper assembly.

In a variant embodiment of the invention that is shown in FIG. 8, it is possible to provide a staple-shaped clip 18 in the tubular coupling, this clip acting as an indicator for two-stage checking that the coupling has been assembled properly. Once the male connector 6 is properly inserted into the female connector, the indicator clip 18 projects from the coupling, i.e. it is in a high position, as shown in dashed lines in FIG. 9, and it enables an operator to make a first check visually or by touch that the coupling is properly assembled.

Figure 9:
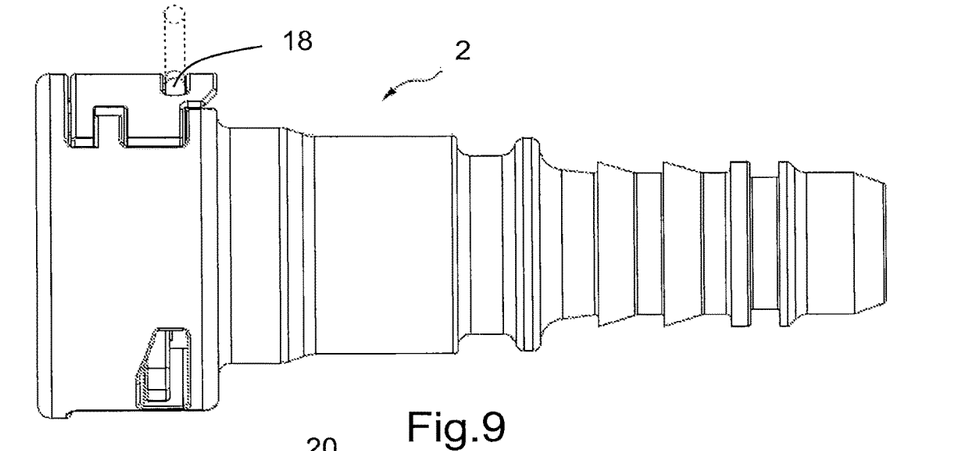
FIG. 9 is a profile view showing the two positions of the indicator clip in the tubular coupling of the invention.
Figure 10:
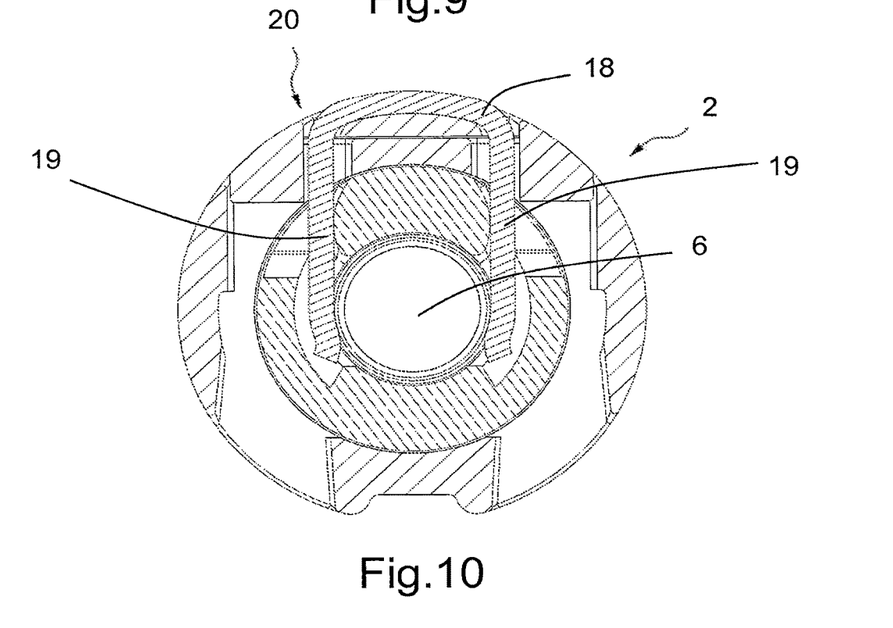
FIG. 10 is a cross-section view showing the tubular coupling with the indicator clip in the low position.

A second check is then made by a second operator who also establishes that the indicator clip 18 is in the projecting position, and pushes it manually into the coupling until it is no longer projecting, i.e. until it is in a low position, as shown in uninterrupted lines in FIG. 9 and in FIG. 10.

This two-stage checking makes it possible to establish that the coupling is assembled properly and thus limits assembly errors on the assembly line.

In this example, the indicator clip is in the form of a staple formed by two prongs 19 that are substantially flexible and parallel, as can be seen in FIGS. 8 and 10.

The prongs 19 of the indicator clip 18 are designed to be inserted into a slot 20 in the connection element 9 that is provided for that purpose, in a transverse direction T shown in FIG. 8, before the male connector is inserted.

Once inserted, the flexible prongs of the indicator clip 18 exert a pressing force on the inside profile of the female connector 2 preventing the indicator clip 18 from being removed unintentionally.

It can also be understood that, while the male connector 6 is being inserted into the female connector 2, the connection element 9 moves transversely into the female connector 2 in order to lock the male connector 6, while the indicator clip 18 remains in the high position, projecting from the coupling. Once the male connector is correctly inserted, the ends of the prongs 19 of the indicator clip stand on the male connector 6, thereby preventing the indicator clip 18 from moving down into the low position without an additional thrust force being exerted.

It should be noted that the mechanism whereby the connection element 9 is moved down does not interact with the mechanism whereby the indicator clip 18 is moved down, because the indicator clip is pushed into the low position manually by an operator.

The invention claimed is:

1. A tubular coupling comprising a female connector into which a male connector provided with an annular collar is designed to be inserted axially, and a connection element that extends in a transverse direction in said female connector and that is designed to be deformed resiliently and radially towards the outside of said female connector by mechanically interfering with said collar while said male connector is being inserted into said female connector, and, in reaction to this radial resilient deformation, to move by itself in said transverse direction towards the inside of said female connector, wherein after the reaction to said radial resilient deformation said connection element on the collar of said male connector, a projection of said connection element, projecting in an axial direction on an axially facing face of said connection element, comes to bear against a guide ramp of said female connector and, by resilient return, exerts pressure on said guide ramp, so as to generate a thrust force that extends the movement of said connection element in said transverse direction towards said inside of said female connector.

2. A coupling according to claim 1, wherein said connection element is U-shaped with two prongs spaced apart from each other and extending in said transverse direction, each prong having an axially facing face for interfering with said collar, wherein said female connector has an inside surface that defines two guide ramps that extend in said transverse direction in a manner such as to slant relative to each other, and wherein two projections are provided on respective ones of said two prongs of said connection element so as to come to bear on respective ones of said guide ramps in order to generate said thrust force.

3. A coupling according to claim 2, wherein each guide ramp has a guide end that is terminated by a recess into which said projection of a corresponding prong of said connection element comes to be engaged.

4. A coupling according to claim 1, wherein said guide ramp has a contact surface that is provided with ribs or with bumps.

5. A coupling according to claim 1, wherein said connection element moves by itself in said transverse direction between a pre-assembly high position in which it projects outside said female connector and a retaining low position in which it is fully pushed into said female connector and comes flush with the outside surface of said female connector.

6. A coupling according to claim 1, wherein said coupling includes a visual indicator for checking proper assembly.

7. A coupling according to any one of claim 1, wherein said coupling includes an indicator clip designed to be inserted into the connection element while said male connector is being inserted into said female connector and serving as an indicator of assembly of said coupling.

* * * * *